(12) United States Patent
Deiderich, III et al.

(10) Patent No.: US 10,866,881 B1
(45) Date of Patent: *Dec. 15, 2020

(54) FIRMWARE DEBUG TRACE CAPTURE

(71) Applicant: American Megatrends International, LLC, Norcross, GA (US)

(72) Inventors: Michael Harry Deiderich, III, Duluth, GA (US); Matthew Hoffmann, Duluth, GA (US); Thomas Gilreath, Sugar Hill, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,393

(22) Filed: Feb. 7, 2020

Related U.S. Application Data

(63) Continuation of application No. 16/119,187, filed on Aug. 31, 2018, now Pat. No. 10,592,393, which is a continuation of application No. 15/444,711, filed on Feb. 28, 2017, now Pat. No. 10,133,654.

(51) Int. Cl.
*G06F 9/44* (2018.01)
*G06F 11/36* (2006.01)
*G06F 9/4401* (2018.01)

(52) U.S. Cl.
CPC ...... *G06F 11/3636* (2013.01); *G06F 11/3664* (2013.01); *G06F 9/4401* (2013.01)

(58) Field of Classification Search
CPC .................................................. G06F 11/3636

USPC ......................................................... 717/128
See application file for complete search history.

(56) References Cited

U.S. PATENT DOCUMENTS

2004/0268310 A1* 12/2004 Morgan .............. G06F 11/3664
717/124
2005/0183069 A1* 8/2005 Cepulis ............... G06F 11/3636
717/128

FOREIGN PATENT DOCUMENTS

EP           0438556 A4 *  3/1993  ......... G06F 12/0866

* cited by examiner

*Primary Examiner* — Evral E Bodden
(74) *Attorney, Agent, or Firm* — Newport IP, LLC; Leonard J. Hope

(57) ABSTRACT

A method for firmware debug trace capture includes creating a hand-off block ("HOB"), capturing first debug trace statements during a boot sequence of a computer and writing the first debug trace statements to the HOB. A trace memory buffer can be created and the first debug trace statements can be copied from the HOB to the trace memory buffer. Second debug trace statements are captured during the boot sequence and appended to the trace memory buffer. In some configurations, the first debug trace statements can be written to the HOB during the pre-Extensible Firmware Interface initialization ("PEI") phase of the boot sequence and the second debug trace statements can be written to the trace memory buffer during the driver execution ("DXE") phase of the boot sequence.

15 Claims, 6 Drawing Sheets

FIRMWARE DEBUG TRACE CAPTURE

CROSS REFERENCE TO RELATED APPLICATIONS

This application is a continuation of U.S. patent application Ser. No. 16/119,187 filed Aug. 31, 2018 now U.S. Pat. No. 10,592,393), which is a continuation of U.S. patent application Ser. No. 15/444,711 (now U.S. Pat. No. 10,133,654), filed Feb. 28, 2017. The contents of each of the above-captioned patent applications are hereby expressly incorporated herein by reference in their entireties.

BACKGROUND

A computer can include firmware that performs initialization of the computer's hardware during the boot process of the computer. The firmware can also load and perform setup operations for the operating system of the computer. The firmware can be implemented in a read-only memory ("ROM") affixed to the motherboard of the computer. A computer can also include, or be attached to, one or more devices such as video cards, displays, disk drives, and input/output devices such as a keyboard, for example. The devices can be on-board devices directly attached to the motherboard. The devices can also be add-on devices that are connected to the motherboard via slots (e.g., a Peripheral Component Interconnect ("PCI" card slot) or connected to the motherboard via a Universal Serial Bus ("USB" port, as just some examples.

During firmware development and testing, firmware developers may include code that generates debug trace statements providing information regarding the state of the firmware when executed or providing information that execution of the firmware reached a point of interest, such as the entry or exit of a function. In some traditional testing environments, the debug trace statements are output to a display via video card connected to the computer executing the firmware, and firmware developers can watch the video display to view and analyze the debug trace statements. In other traditional testing environments, the debug trace statements are output to a peripheral device (e.g., a printer) via a serial communications port, such as a RS-232 port.

Some embedded computing systems having firmware do not have video cards, displays, or serial communications ports for interfacing peripheral devices with the computing systems. In addition, some computing systems used for testing firmware may have defective and inoperative video cards, displays, and/or serial communications ports. Testing of such computing systems using debug trace statements can be difficult as the traditional methods for outputting the debug trace statements are not available.

SUMMARY

Technologies are described herein for providing debug trace capture for computer system firmware. Through implementation of the disclosed technologies developers can capture debug trace statements while testing firmware for output limited computing systems lacking functional video capabilities or serial communication ports.

In some configurations, the disclosed technologies offer a technical solution for capturing debug trace statements in output limited systems by redirecting debug trace statements to memory or a file. The storage location of the debug trace statements may vary based on the boot cycle phase. During early phases of the boot cycle when the computer system's memory and file system is not available, the debug trace statements can be temporarily saved in processor cache and then copied to memory and/or a file once available.

In one aspect, a method for firmware debug trace capture includes creating a hand-off block ("HOB"), capturing first debug trace statements during a boot sequence of a computer, and writing the first debug trace statements to the HOB. A trace memory buffer can be created and the first debug trace statements can be copied from the HOB to the trace memory buffer. Second debug trace statements are captured during the boot sequence and appended to the trace memory buffer. In some configurations, the first debug trace statements can be written to the HOB during the pre-Extensible Firmware Interface initialization ("PEI") phase of the boot sequence and the second debug trace statements can be written to the trace memory buffer during the driver execution ("DXE") phase of the boot sequence.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for debug trace capture in a computer system firmware. As discussed briefly above, through an implementation of the technologies disclosed herein, debug trace capture for a firmware can be generated and stored in memory or a file in a simple and efficient manner when traditional output using video cards or communications ports are not available. Additional details regarding these aspects will be provided below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
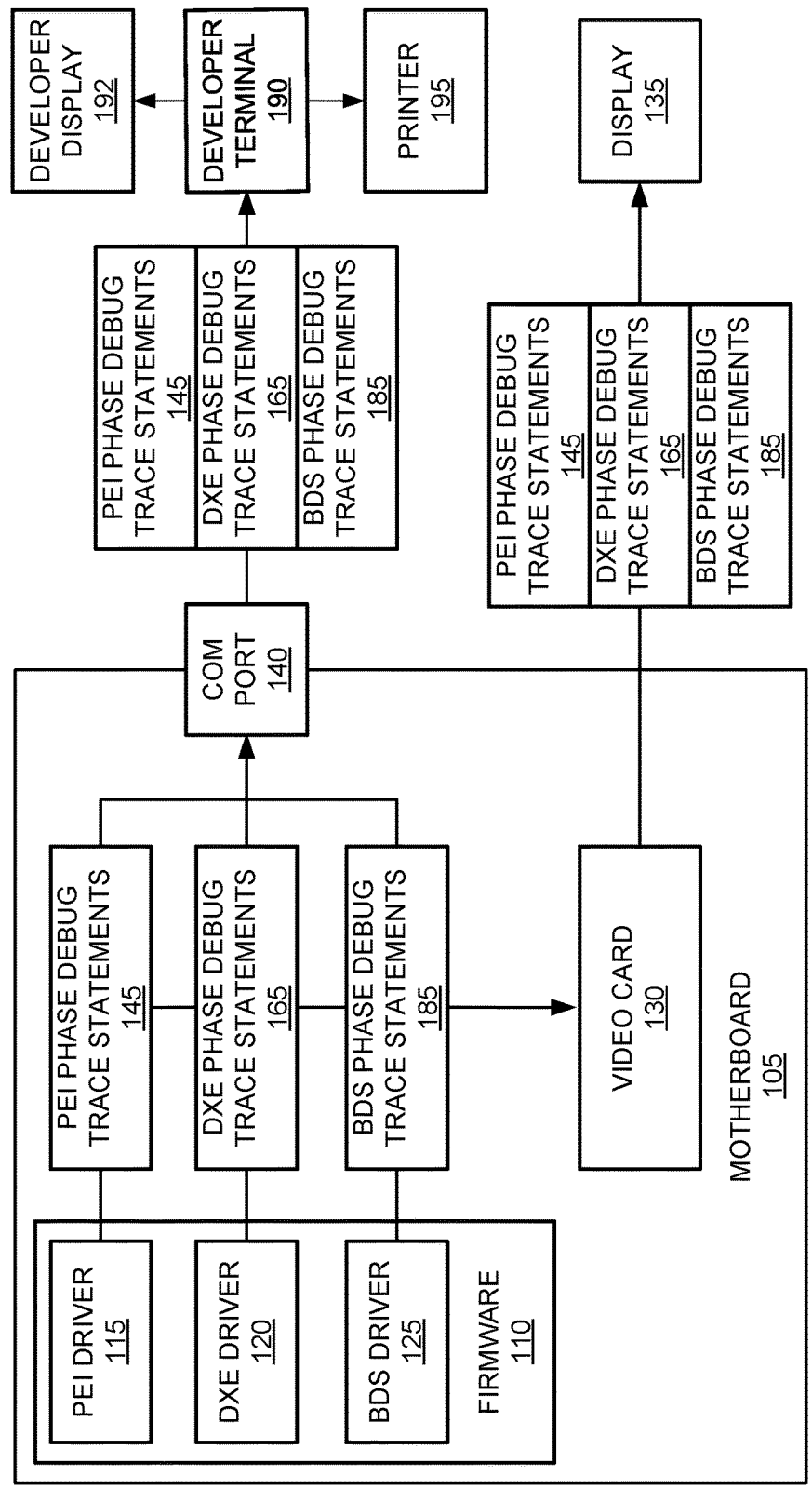
FIG. 1 is a block diagram of a configuration of a computer system using traditional debug trace capture techniques.

FIG. 1 is a block diagram of a configuration of a computer system 100 using traditional debug trace capture techniques. The computer system 100 can include a motherboard 105. The motherboard 105 can include a firmware 110, a video card 130, and a communication ("COM") port 140, among other components. For example, the computer system 100 can include the components described below with respect to FIG. 6, below.

The firmware 110 can include one or more software modules or components that provide control and monitoring of the computer system 100 or can provide manipulation of data accessible by the computer system 100. The firmware 110 can include Basic Input/Output System ("BIOS") firmware or Unified Extensible Firmware Interface ("UEFI") Specification compliant firmware for a computing system. The firmware can also include, for example, embedded system firmware.

The video card 130 can include, for example, an expansion card that generates output streams for rendering on a video display, such as the display 135 of FIG. 1, and can include a graphics processor, a heat sink, a specialized video BIOS or option read-only memory (option ROM), and/or an analog to digital converter, in some configurations.

The COM port 140 can include a port used to connect the motherboard 105 with external devices or computer systems. For example, as shown in FIG. 1, the COM port 140 can be used to connect the motherboard 105 with a developer terminal 190. The COM port 140 can be a serial port in some configurations, such as a port complaint with the RS-232 standard.

According to some configurations, the firmware 110 can include various drivers that perform functions and operations during the boot cycle of the computer system 100. In some configurations, the firmware complies with the UEFI standard and the firmware can include one or more drivers corresponding to the boot cycle specified in the UEFI standard. For example, as shown in FIG. 1, the firmware 110 can include a pre-EFI initialization ("PEI") driver 115 that performs functions and operations consistent with the PEI phase of the UEFI boot cycle, a driver execution environment ("DXE") driver 120 that performs functions and operations consistent with the DXE phase of the UEFI boot cycle, and a boot device selection ("BDS") driver 125 that performs functions and operations consistent with the BDS phase of the UEFI boot cycle.

Although FIG. 1 shows each of the PEI driver 115, the DXE driver 120, and the BDS driver 125 as singular components, in some configurations, each of the PEI driver 115, the DXE driver 120, and the BDS driver 125 may contain multiple components or subcomponents. While this disclosure may reference operations and functionality as being performed by one of the PEI driver 115, the DXE driver 120, and the BDS driver 125, such functionality may be performed by another of the PEI driver 115, the DXE driver 120, and the BDS driver 125 in some configurations.

The source code for the firmware 110 can include code used for debugging purposes. The debugging code (not shown in FIG. 1) can include instructions for generating information about the current state of execution for the computer system 100 such as function entry and/or exit, that a current line of code is being executed, or product output of one more variables. The code can be, for example, a function call to print a string to a display or standard output of the computer system 100, generate a graphic, or change the state of an output device. In some configurations, the source code of firmware 110 incorporates functions or methods for printing a string or value to a display, similar to the printf function available in the C programming language.

As shown in FIG. 1, each of the PEI driver 115, the DXE driver 120, and the BDS driver 125 may generate PEI phase debug trace statements 145, DXE phase debug trace statements 165 and BDS phase debug trace statements 185, respectfully. Each of the PEI phase debug trace statements 145, the DXE phase debug trace statements 165, and the BDS phase debug trace statements 185 can include debug trace statements corresponding to their respective phase such as statements related to function entry or exit, execution of a line of code, entry from one phase to another, or variable values. The PEI phase debug trace statements 145, the DXE phase debug trace statements 165 and the BDS phase debug trace statements 185 can provide information to developers when testing the motherboard 105 and/or firmware 110 to assist in addressing errors or faults.

In a traditional debugging environment, the PEI phase debug trace statements 145, the DXE phase debug trace statements 165, and the BDS phase debug trace statements 185 may be sent to the video card 130 and/or the COM port 140. When sent to the video card 130, the PEI phase debug trace statements 145, the DXE phase debug trace statements 165 and the BDS phase debug trace statements 185 may be rendered on the display 135. When sent to the COM port 140, the PEI phase debug trace statements 145, the DXE phase debug trace statements 165 and the BDS phase debug trace statements 185 may be received by a developer terminal 190 which may either display the PEI phase debug trace statements 145, the DXE phase debug trace statements 165, and the BDS phase debug trace statements 185 on the developer display 192 or print the PEI phase debug trace statements 145, the DXE phase debug trace statements 165 and the BDS phase debug trace statements 185 using the printer 195. Although not shown in FIG. 1, computing devices other than developer terminal 190 may receive the PEI phase debug trace statements 145, the DXE phase debug trace statements 165 and the BDS phase debug trace statements 185 and display and/or print them via the COM port 140.

Figure 2:
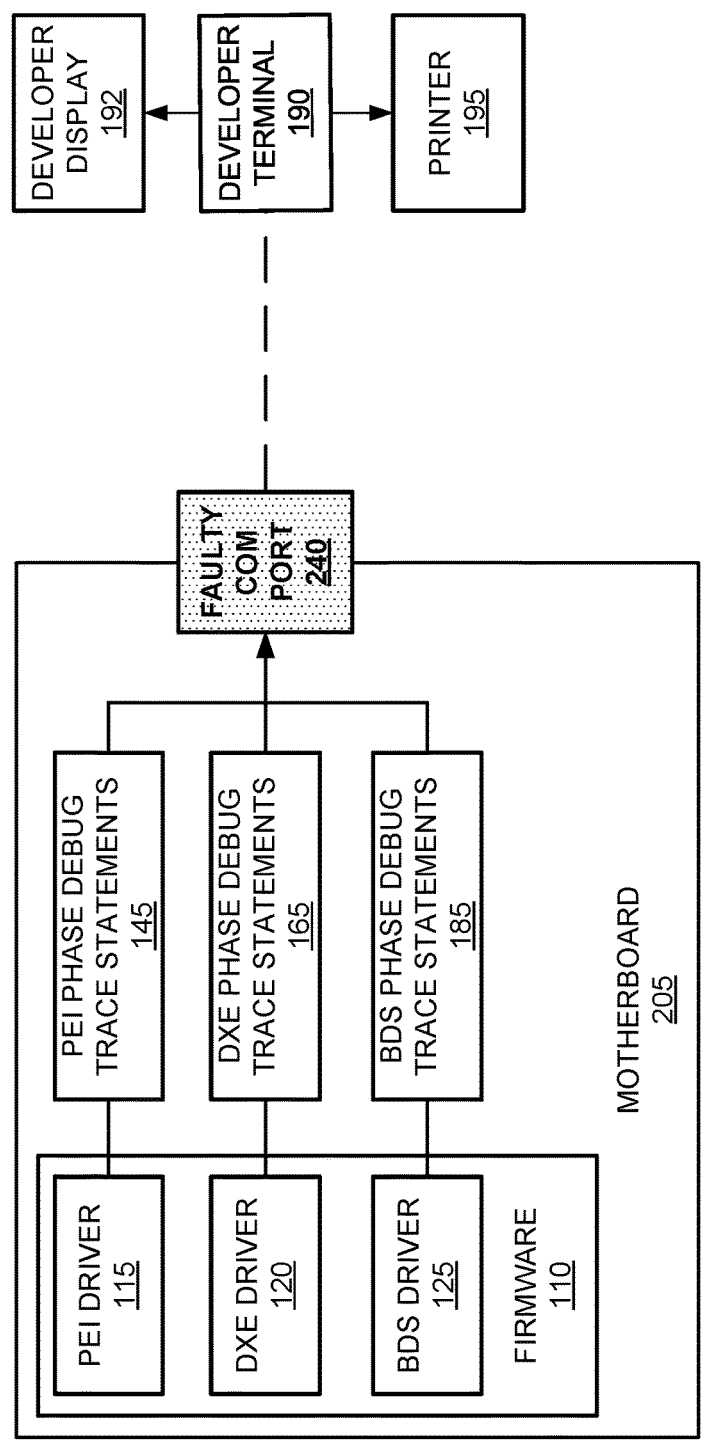
FIG. 2 is a block diagram of a configuration of a computer system unable to perform debug trace capture according to traditional techniques.

FIG. 2 is a block diagram of a configuration of a computer system 200 unable to perform debug trace capture according to traditional techniques described above in FIG. 1. Unlike the computer system 100 of FIG. 1, the computer system 200 of FIG. 2 does not have a video card and is not attached to a display. For example, the computer system 200 may be for an embedded system where a video card is unnecessary. Moreover, the motherboard 205 of the computer system 200 has a faulty COM port 240 that is not operating as expected. For example, while the PEI driver 115, the DXE driver 120, and the BDS driver 125 may attempt sending the PEI phase debug trace statements 145, the DXE phase debug trace statements 165 and the BDS phase debug trace statements 185 to the faulty COM port 240, the faulty COM port 240 is unable to communicate the PEI phase debug trace statements 145, the DXE phase debug trace statements 165 and the BDS phase debug trace statements 185 to the developer terminal 190.

In systems, such as the example computer system 200 shown in FIG. 2, which lack a video card (or, in some configurations a COM port) or which have a faulty COM port (or, in some configurations a faulty video card), the PEI phase debug trace statements 145, the DXE phase debug trace statements 165 and the BDS phase debug trace statements 185 cannot be analyzed because they are not output from the motherboard 205. To address this problem, disclosed configurations write the PEI phase debug trace statements 145, the DXE phase debug trace statements 165 and the BDS phase debug trace statements 185 to one or more memory locations. When the file system of the computer system being tested is available, the PEI phase debug trace statements 145, the DXE phase debug trace statements 165 and the BDS phase debug trace statements 185 can be copied to a file and accessed by developers for analysis.

Figure 3:
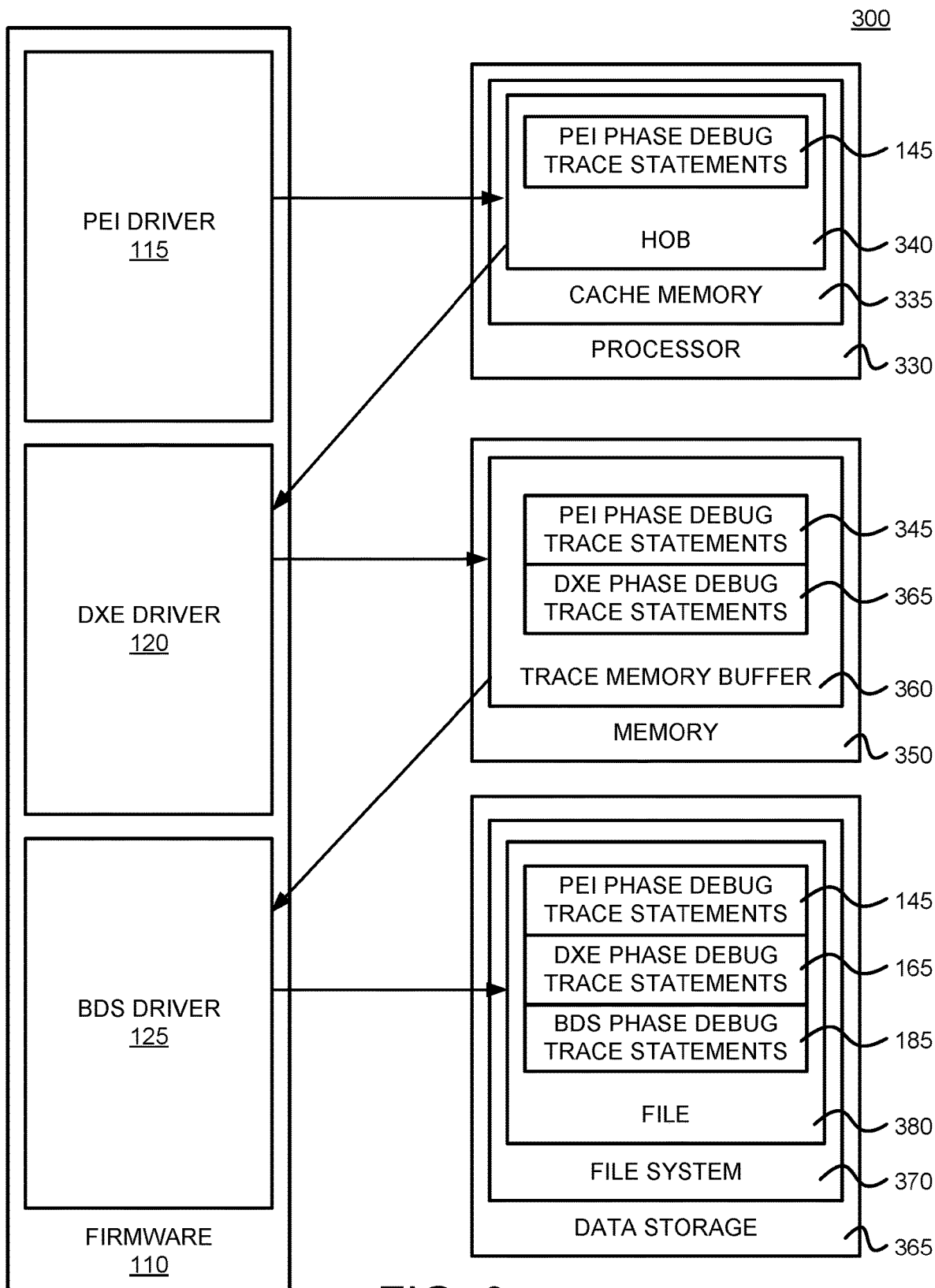
FIG. 3 is a block diagram showing the components for debug trace capture consistent with disclosed configurations.

FIG. 3 is a block diagram showing the components of a computer system 300 and the flow of operations between those components for debug trace capture consistent with disclosed configurations. As shown in FIG. 3, the computer system 300 includes a firmware 110, a processor 330, a memory 350, and a data storage 365. The computer system 300 may also include other computing components such as those described below with respect to FIG. 6. The computer system 300 provides another method for capturing the PEI phase debug trace statements 145, the DXE phase debug trace statements 165 and the BDS phase debug trace statements 185 which can be used as an alternative or an addition to the methods described above with respect to FIG. 1.

The processor 330 can include a cache memory 335. The cache memory 335 can be a fast and relatively small memory not used by software applications executed by the computer system 300 once the computer system 300 has completed boot. The cache memory 335 can be used to store the most recently used ("MRU") main memory data. During a boot cycle consistent with the UEFI specification, one or more blocks of data used for the PEI phase to DXE phase transition—sometimes called hand-off blocks ("HOBs")—can be stored in the cache memory 335.

In some configurations, the PEI driver 115 can write PEI phase debug trace statements to a HOB 340. The PEI driver 115 may first initialize, or create, the HOB 340 for capturing the PEI phase debug trace statements 145. The PEI driver 115 may initialize the HOB 340 by allocating and reserving memory in the cache memory 335. Once the HOB is created, the PEI driver 115 may write the PEI phase debug trace statements to the HOB 340 as opposed to (or, in some configurations, in addition to) writing the PEI phase debug trace statements to a COM port or video card.

The cache memory is limited, and the PEI phase is considered a limited memory environment as a result. In some configurations, the PEI phase initializes the HOB using its maximum size, which will be less than the maximum capacity of the cache memory 335 in some configurations. For example, the maximum HOB size may be defined by a percentage of the available cache memory 335 (e.g., 10% of available memory) or by a fixed absolute size (e.g., 1 MB).

In some configurations, the size of all PEI phase debug trace statements 145 may be larger than the size of HOB 340. For example, the PEI phase debug trace statements 145 require 3 MBs of space, while the HOB 340 is only 1.5 MB. In such configurations, the PEI driver 115 may implement a circular buffer to address the space limitations of the HOB 340. Using a circular buffer, when the PEI debug trace statements exceed the capacity of the HOB 340, the PEI driver 115 may flush, or empty, the HOB 340 and begin writing the PEI phase debug trace statements to the HOB 340.

If the capacity of the HOB 340 is again exceeded, the PEI driver 115 may flush the HOB 340 again and continue writing the PEI phase debug trace statements 145 to the HOB 340. Using a circular buffer may result in the loss of debug information as the HOB 340 may contain just a subset of the PEI phase debug trace statement 145—the last of PEI debug trace statements for the PEI phase.

The PEI driver may implement a blocking buffer in some configurations. Using a blocking buffer, if the PEI phase debug trace statements 145 exceed the capacity of the HOB 340, the PEI driver 115 may block additional PEI phase debug statements from being written to the HOB 340. Using a blocking buffer may result in the loss of debug information as the HOB 340 may contain just a subset of the PEI phase debug trace statement 145—the first of PEI debug trace statements for the PEI phase up until the capacity of the HOB 340 was about to be exceeded.

The memory 350 can include a trace memory buffer 360 in some configurations. The DXE driver 120 may write the DXE phase debug trace statements 165 to the trace memory buffer 360 as opposed (or in addition) to a COM port or a video card. Once memory 350 is available after the PEI to DXE transition, the DXE driver 120 may create the trace memory buffer 360 by allocating memory for it. The DXE driver 120 may also access the HOB 340 (along with other HOBs per the UEFI specification) and copy any of the PEI phase debug trace statements 145 within the HOB 340 to the trace memory buffer 360. As the DXE phase progresses, the DXE driver 120 may append the DXE phase debug trace statements 165 to the trace memory buffer.

In some configurations, the computer system 300 includes a data storage 365. The data storage 365 can include a hard drive disk, a USB drive, flash memory, or other known methods for storing data in a computer system. The data storage 365 may include a file system 370 controlling how data is stored and retrieved. The file system 370 may manage one or more files storing data. As shown in FIG. 3, the file system 370 manages a file 380 storing the PEI phase debug trace statements 145, the DXE phase debug trace statements 165, and the BDS phase debug trace statements 185. In a typical UEFI complaint computer system, the data storage 365 and the file system 370 are not available until the BDS phase of the boot cycle.

After the DXE to BDS transition, the BDS driver 125 may access the trace memory buffer 360 and write the PEI phase debug trace statements 145 and the DXE phase debug trace statements 165 to the file 380. In some configurations, the BDS driver 125 may append the BDS phase debug trace statements to the file 380 after the BDS driver 125 copies the PEI phase debug trace statements 145 and the DXE phase debug trace statements 165 to the file 380. In some configurations, for efficiency, the BDS driver 125 may buffer the PEI phase debug trace statements 145, the DXE phase debug trace statements 165, and the BDS phase debug trace statements 185 in memory and write all of the PEI phase debug trace statements 145, the DXE phase debug trace statements 165, and the BDS phase debug trace statements 185 to the file 380 once the boot cycle of the computer system 300 is complete. In some configurations, the BDS driver 125 copies the PEI phase debug trace statements 145 and the DXE phase debug trace statements 165 to the file 380 at the start of the BDS phase, and the BDS phase debug trace statements 185 are appended to the file 380 as the BDS phase executes. The BDS phase debug trace statements 185 may be written to the file one at a time, or several at a time, in various configurations.

Figure 4:
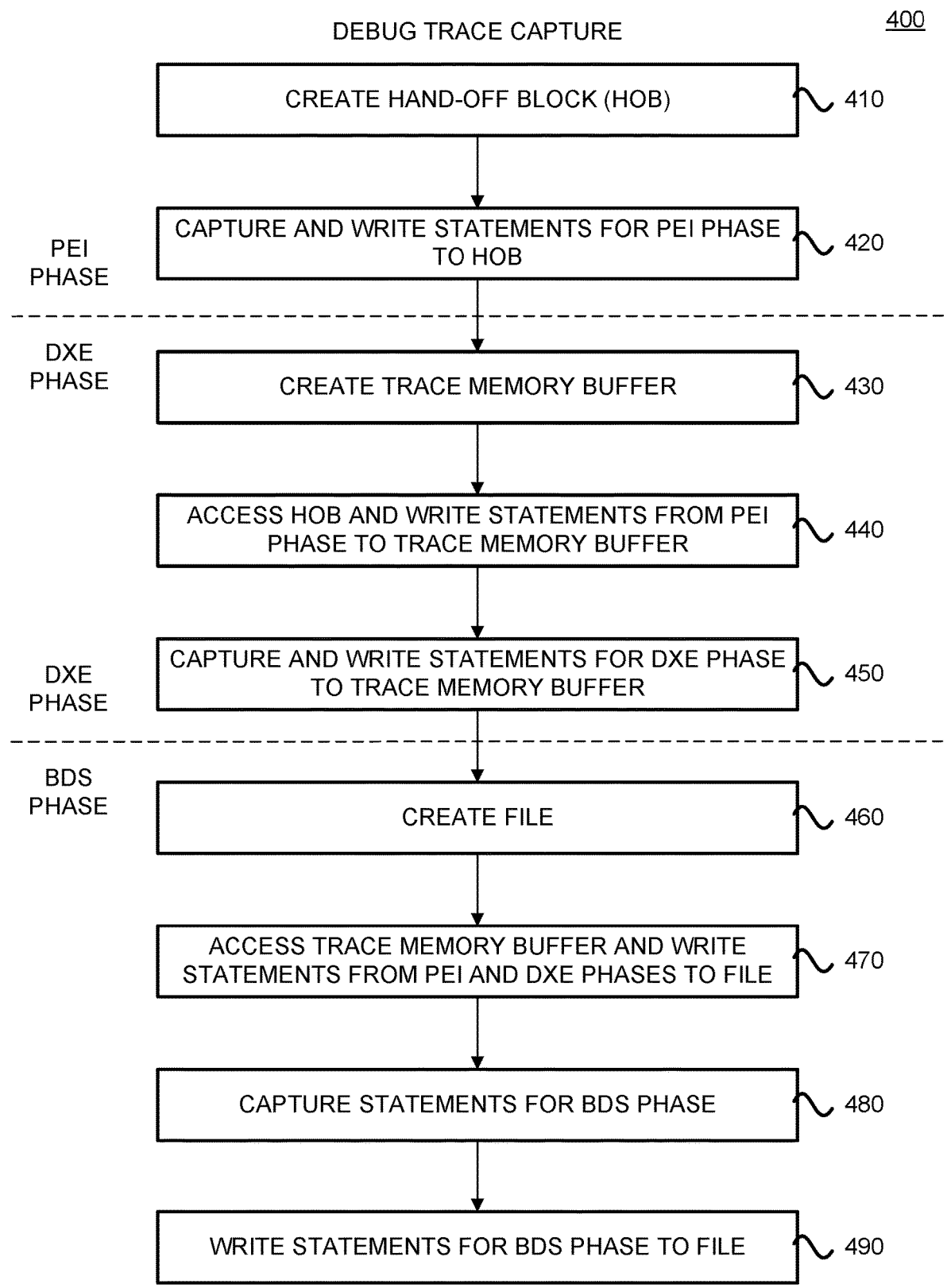
FIG. 4 is a flow diagram showing a routine for debug trace capture consistent with disclosed implementations.

FIG. 4 is a flow diagram showing a debug trace capture routine 400 consistent with disclosed configurations. It should be appreciated that the logical operations described with respect to FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The debug trace capture routine 400 may be performed by a computer system's firmware during the boot cycle of the computer system. The firmware can be a UEFI complaint firmware and the boot cycle of the computer system may have phases consistent with the UEFI specification. For example, as shown in FIG. 4, the debug trace capture routine 400 may have operations that occur during the PEI phase, the DXE phase and/or the BDS phase of the boot cycle. In some configurations, operations of the debug trace capture routine 400 that are performed in a phase according to FIG. 4 may be performed in a different phase.

The debug trace capture routine 400 begins at operation 410 where the PEI driver creates a HOB. The PEI driver may create the HOB to have its maximum allowable size consistent with the UEFI specification. As noted above, the PEI driver may allocate cache memory of a processor for implementing the HOB.

Once the PEI driver creates the HOB, the PEI driver may capture debug trace statements for the PEI phase of the computer's boot cycle at operation 420. The PEI driver may also write the debug trace statements to the HOB at operation 420. According to some configurations, the PEI driver may flush the HOB after writing some of the debug trace statements from the PEI phase when the HOB reaches maximum capacity. The PEI driver may then write further debug trace statements from the PEI phase to the HOB once the HOB has sufficient capacity to accept them. In some configurations, the PEI driver may prevent or stop writing debug trace statements to the HOB when the HOB reaches maximum capacity.

The debug trace capture routine 400 continues over the PEI to DXE transition where, at operation 430, the DXE driver creates a trace memory buffer by allocating memory for storing debug trace statements from both the PEI phase and the DXE phase. At operation 440, the DXE driver may access the HOB and copy the debug trace statements from the PEI phase to the trace memory buffer. As the DXE phase progresses, the DXE driver may capture and write the debug trace statements from the DXE phase to the trace memory buffer, at operation 450. In some configurations, the DXE driver may append the debug trace statements from the DXE phase to the trace memory buffer after the debug trace statements from the PEI phase.

The debug trace capture routine 400 continues over the DXE to BDS transition where, at operation 460, the BDS driver creates a file for storing the debug trace statements from the PEI and DXE phases. The BDS driver may create the file once a file system for the computer performing the debug trace capture routine 400 becomes available. In some configurations, the file created on a local data storage such as a hard-disk drive or a flash memory drive. In some configurations, the file can be created on an external data storage such as a USB drive.

At operation 470, the BDS driver may access the trace memory buffer and write the debug trace statements from the PEI and DXE phases to the file. In some configurations, at operation 480, the BDS driver may capture debug trace statements for the BDS phase. The BDS debug trace statements may be written to a memory buffer, and then written to the file at operation 490. In some configurations, the BDS driver may perform operation 470 after performing operation 480. For example, the BDS driver may capture and append debug trace statements from the BDS phase to the trace memory buffer (or some other memory buffer created during the BDS phase), then write the debug trace statements for the PEI, DXE, and BDS phases to the file. In some configurations, after the debug trace capture routine 400 executes, the file may be transferred to an external data storage. For example, in some configurations, the file may be transferred to a USB drive.

Figure 5:
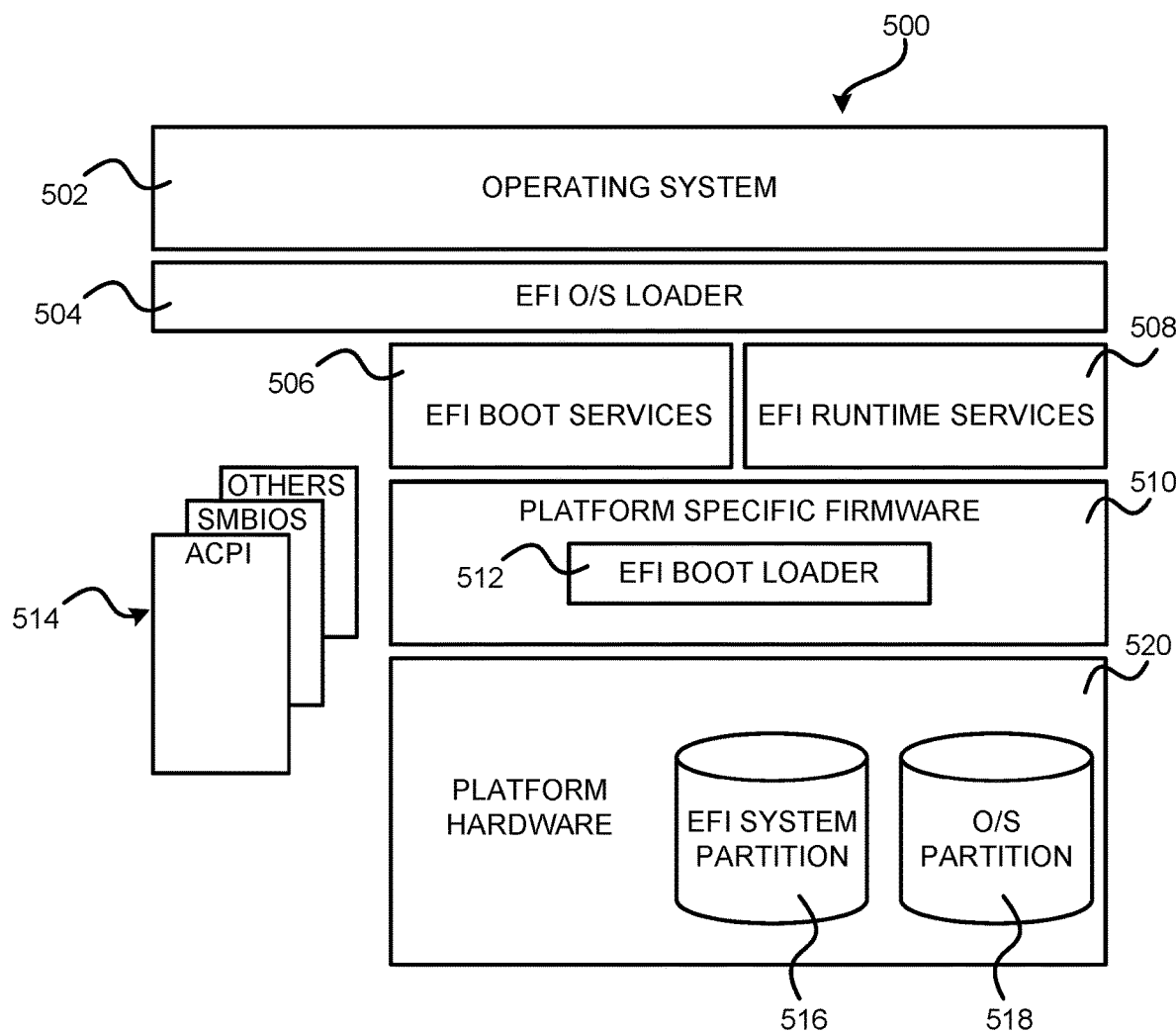
FIG. 5 is a software architecture diagram illustrating a software architecture for a Unified Extensible Firmware Interface ("UEFI") Specification-compliant firmware that provides an operating environment for the technologies presented herein in one particular configuration.

Turning now to FIG. 5, a software architecture diagram will be described that illustrates an architecture for a UEFI Specification-compliant firmware that can be implemented using the technologies disclosed herein. The UEFI Specification describes an interface between an operating system 502 and a UEFI Specification-compliant firmware. The UEFI Specification also defines an interface that the firmware can implement, and an interface that the operating system 502 can use while booting. How the firmware implements the interface can be left up to the manufacturer of the firmware. The UEFI Specification also defines a way for the operating system 502 and firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 502. The operating system ("OS" or "O/S") image can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. For example, a set of runtime services can be presented to ensure appropriate abstraction of base platform hardware resources used by the operating system 502 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
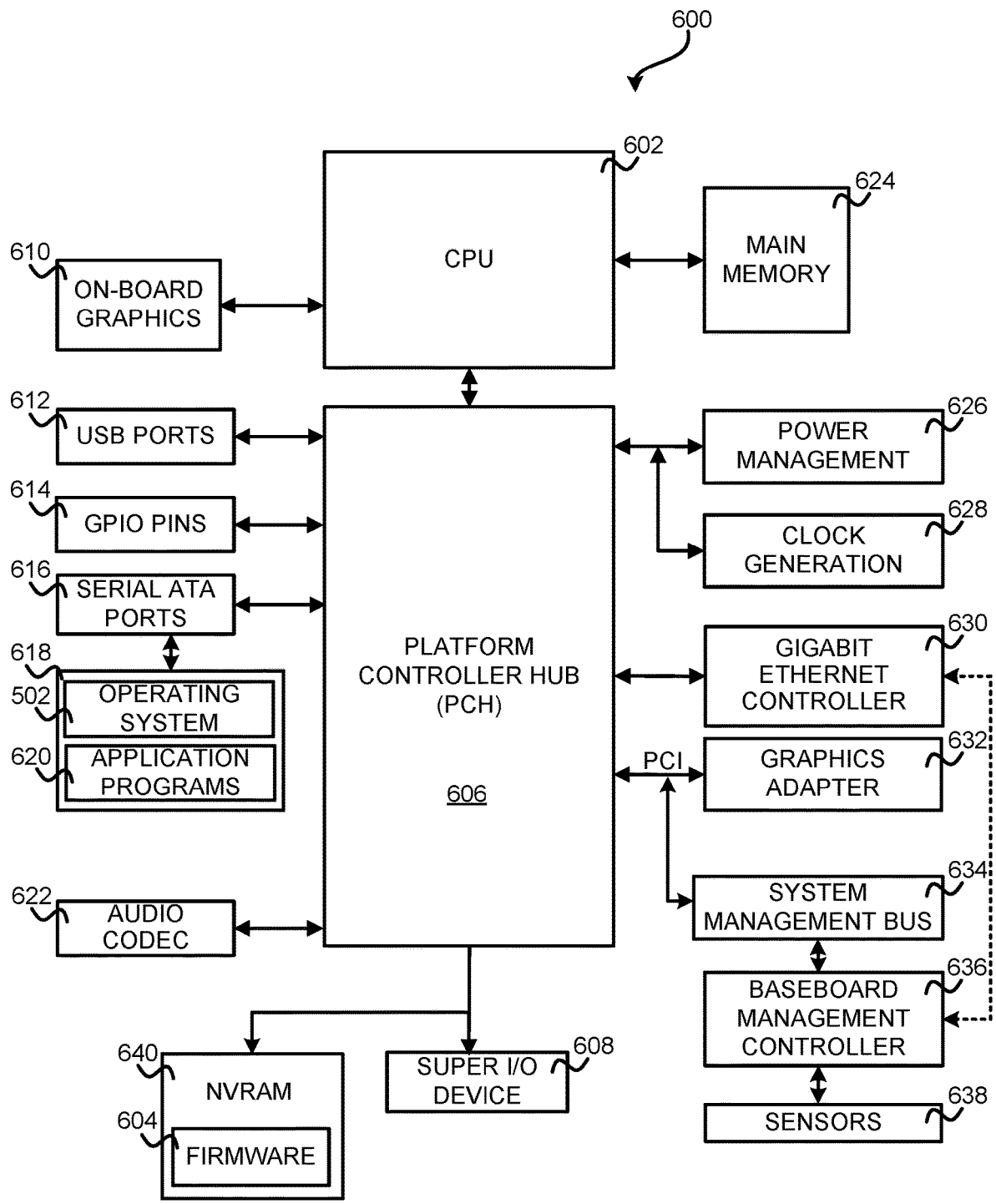
FIG. 6 is a computer architecture diagram that shows an illustrative architecture for a computer that can provide an operating environment for the technologies disclosed herein.

Referring now to FIG. 6, a computer architecture diagram that illustrates an illustrative architecture for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 610. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC'97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs 620, such as a SATA disk drive 618. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or compact disc read-only memory ("CD-ROM") drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, read-only memory ("ROM") erasable programmable read-only memory ("EPROM"), electrically erasable programmable read-only memory ("EEPROM") flash memory or other solid state memory technology, CD-ROM, Digital Versatile Disc ("DVD"), High Definition Digital Versatile Disc ("HD-DVD"), BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a non-volatile random access memory ("NVRAM") 640 for storing firmware 604 that includes program code containing the basic routines that help to start up the computer 600 and to transfer information between elements within the computer 600.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 640. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for firmware debug trace capture have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What we claim is:

1. A computer-implemented method comprising:
generating a first debug trace statement during a first phase of a boot sequence of a computer, wherein the first phase corresponds to a pre-extensible firmware interface initialization (PEI) phase;
writing the first debug trace statement to a first memory location during the first phase;
copying the first debug trace statement from the first memory location to a second memory location;
generating a second debug trace statement during a second phase of the boot sequence of the computer; and
writing the second debug trace statement to the second memory location during the second phase.

2. The computer-implemented method of claim 1, wherein the second phase corresponds to a driver execution environment (DXE) phase of the boot sequence of the computer.

3. The computer-implemented method of claim 1, further comprising generating a third debug trace statement during a third phase of the boot sequence of the computer.

4. The computer-implemented method of claim 3, further comprising:
copying the first debug trace statement and the second debug trace statement from the second memory location to data storage; and
writing the third debug trace statement to the data storage.

5. The computer-implemented method of claim 3, wherein the third phase corresponds to a boot device selection (BDS) phase.

6. A non-transitory computer-readable storage medium having computer-executable instructions stored thereon that, when executed, cause a computer to perform operations comprising:
generating a first debug trace statement during a first phase of a boot sequence of a computer, wherein the first phase corresponds to a pre-extensible firmware interface initialization (PEI) phase;
writing the first debug trace statement to a first memory location during the first phase;
copying the first debug trace statement from the first memory location to a second memory location;
generating a second debug trace statement during a second phase of the boot sequence of the computer; and
writing the second debug trace statement to the second memory location during the second phase.

7. The non-transitory computer-readable storage medium of claim 6, wherein the second phase corresponds to a driver execution environment (DXE) phase of the boot sequence of the computer.

8. The non-transitory computer-readable storage medium of claim 6, wherein the operations further comprise generating a third debug trace statement during a third phase of the boot sequence of the computer.

9. The non-transitory computer-readable storage medium of claim 8, wherein the operations further comprise:
copying the first debug trace statement and the second debug trace statement from the second memory location to data storage; and
writing the third debug trace statement to the data storage.

10. The non-transitory computer-readable storage medium of claim 8, wherein the third phase corresponds to a boot device selection (BDS) phase.

11. A computing device, comprising:
a processor; and
a memory having computer-executable instructions stored thereupon which, when executed by the processor, cause the computing device to:
generate a first debug trace statement during a first phase of a boot sequence of a computer, wherein the first phase corresponds to a pre-extensible firmware interface initialization (PEI) phase;
write the first debug trace statement to a first memory location during the first phase;
copy the first debug trace statement from the first memory location to a second memory location;
generate a second debug trace statement during a second phase of the boot sequence of the computer; and
write the second debug trace statement to the second memory location during the second phase.

12. The computing device of claim 11, wherein the second phase corresponds to a driver execution environment (DXE) phase of the boot sequence of the computer.

13. The computing device of claim 11, wherein execution of the computer-executable instructions further causes the computing device to generate a third debug trace statement during a third phase of the boot sequence of the computer.

14. The computing device of claim 13, wherein execution of the computer-executable instructions further causes the computing device to:
copy the first debug trace statement and the second debug trace statement from the second memory location to data storage; and
write the third debug trace statement to the data storage.

15. The computing device of claim 13, wherein the third phase corresponds to a boot device selection (BDS) phase.

* * * * *